ABSTRACT

United States Patent [19]

Enomoto et al.

[11] 4,044,105

[45] Aug. 23, 1977

[54] PROCESS FOR PREPARATION OF CALCIUM HYDROGEN PHOSPHATE ANHYDRIDE

[75] Inventors: Takamitsu Enomoto; Motoshige Ogura; Tetsuhiro Ono, all of Ube, Japan

[73] Assignee: Central Glass Company, Limited, Ube, Japan

[21] Appl. No.: 653,036

[22] Filed: Jan. 28, 1976

[30] Foreign Application Priority Data

Jan. 29, 1975 Japan .................................. 50-11424

[51] Int. Cl.² .................... C01B 15/16; C01B 25/26
[52] U.S. Cl. .................................. 423/308; 423/311; 23/304
[58] Field of Search ............................ 423/307–313; 23/304

[56] References Cited

U.S. PATENT DOCUMENTS

| 3,095,269 | 6/1963 | Chiola et al. | 423/308 |
| 3,395,979 | 8/1968 | Schafer | 423/308 |

FOREIGN PATENT DOCUMENTS

| 1,179,456 | 1/1970 | United Kingdom | 423/310 |

Primary Examiner—O. R. Vertiz
Assistant Examiner—Gregory A. Heller
Attorney, Agent, or Firm—Lowe, King, Price & Markva

[57] ABSTRACT

An aqueous slurry of $CaHPO_4.2H_2O$ in a 5-20 Wt% concentration is prepared by the use of the phosphate dihydrate obtained by reaction of $NaNH_4HPO_4.4H_2O$ with $CaCl_2$ in water. After adjustment of the pH of the slurry to 4.5–5.5, the slurry is rapidly heated to 85°–97° C by contact with steam to convert the dihydrate to the anhydride, which is suitable for use in the preparation of fluorescent materials due to its high purity, platy and square crystal shape and uniform particle size.

10 Claims, 8 Drawing Figures

10μm

10μm

10μm

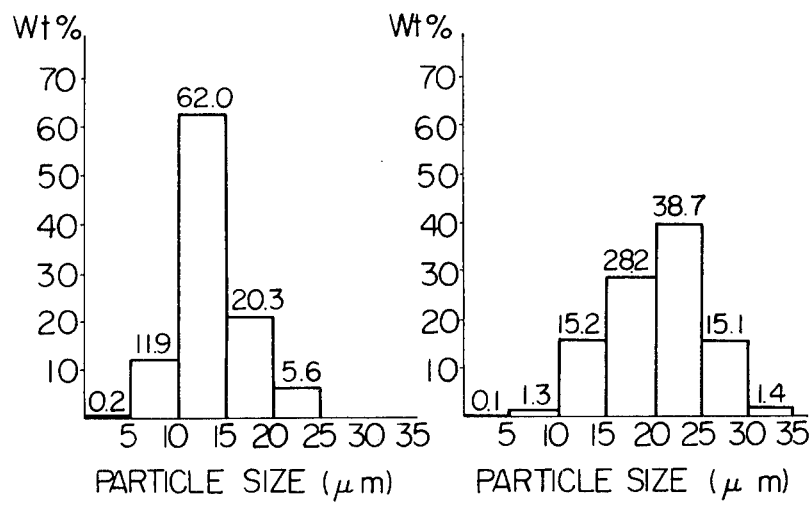
Fig. 6
Fig. 7
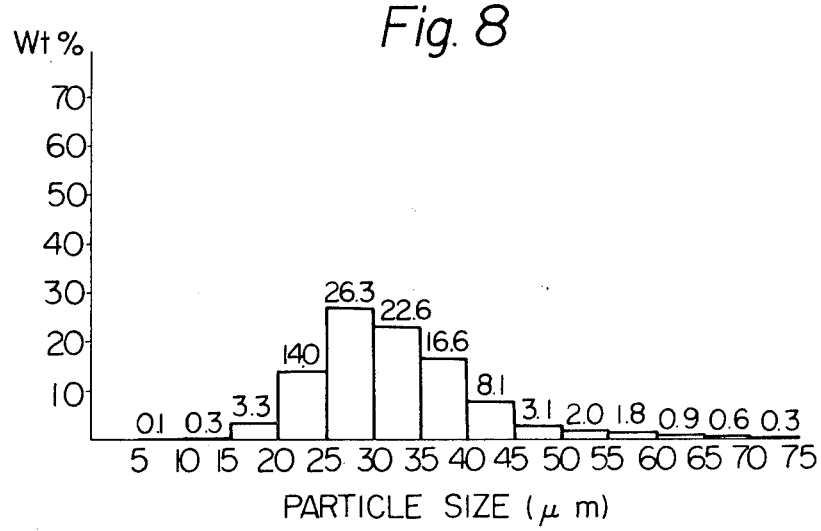
Fig. 8

PROCESS FOR PREPARATION OF CALCIUM HYDROGEN PHOSPHATE ANHYDRIDE

This invention relates to a process of preparing calcium hydrogen phosphate anhydride, and more particularly to a process of preparing crystalline calcium hydrogen phosphate anhydride which is of high purity and uniform in particle size and has a platy and square crystal shape by the use of sodium ammonium hydrogen-phosphate of industrial grade. The product of the process is useful particularly as a raw material for fluorescent materials.

It is known that the luminescence and optimum luminous intensity of a fluorescent lamp is affected considerably by the purity, particle shape and particle size distribution of the primary raw material for the phosphor used in the fluorescent lamp. With respect to calcium hydrogen phosphate anhydride $CaHPO_4$ which is used as a primary raw material for phosphate phosphors, the phosphate anhydride is required to be of high purity and in the form of platy and square crystals which are adequately small and very uniform in the particle size. A high purity and a platy and square crystal shape of this phosphate anhydride lead to an excellent durability of the phosphor against mechanical and environmental stresses and a desirable transparency. An adequately small and uniform particle size of the phosphate anhydride results in that the phosphor can be dispersed easily and uniformly.

Calcium hydrogen phosphate anhydride is obtained by the dehydration of calcium hydrogen phosphate dihydrate $CaHPO_4.2H_2O$. At present, calcium hydrogen phosphate dihydrate for the preparation of the anhydride for use as a raw material of fluorescent materials is prepared usually by a reaction of a refined and, hence, costly phosphoric acid with a refined calcium salt to meet the aforementioned requirements for the anhydride. This reaction is carried out at or in the vicinity of room temperature. An aqueous slurry is prepared by adding water (or by the use of the mother liquor) to the precipitated calcium hydrogen phosphate dihydrate and heated to 70°–100° C to cause the dehydration. Alternatively, the precipitate is separated from the mother liquor and dried at or above 100° C. According to a process disclosed in Published Japanese Patent Application No. 49-37713, a slurry of calcium hydrogen phosphate, dihydrate, which is prepared by the reaction between diammonium hydrogen-phosphate and calcium chloride, is maintained at an appropriately elevated temperature for a sufficiently long period of time with a precise temperature control for accomplishing the dehydration.

Calcium hydrogen phosphate anhydride prepared by any of these conventional processes, however, is not fully satisfactory in its purity, crystal shape and/or particle size distribution. Besides, a slurry of calcium hydrogen phosphate dihydrate must be maintained at an elevated and controlled temperature for a considerably long period of time to accomplish the dehydration in every conventional process. Accordingly, conventional processes of preparing calcium hydrogen phosphate anhydride are not well suitable to prepare the phosphate anhydride for use as a raw material for fluorescent materials from the viewpoints of heat economy and the quality of the product.

It is an object of the present invention to provide an economical process of preparing crystalline calcium hydrogen phosphate anhydride which is of high purity and suitable as a raw material for phosphate fluorescent materials.

It is another object of the invention to provide a process of preparing calcium hydrogen phosphate anhydride in the form of platy and square crystals which are very uniform in size.

According to the invention, a process of preparing calcium hydrogen phosphate anhydride which is useful as a raw material of a fluorescent material comprises the following steps:

a. preparing calcium hydrogen phosphate dihydrate by the reaction in water of sodium ammonium hydrogenphosphate with calcium chloride;

b. preparing an aqueous slurry of calcium hydrogen phosphate dihydrate in a concentration ranging from 5 to 20 Wt%;

c. adjusting the pH of the slurry to a value in the range from 4.5 to 5.5; and d. heating the slurry rapidly to a temperature in the range from 85° to 97° C thereby to dehydrate the calcium hydrogen phosphate dihydrate in the slurry.

The heated slurry is preferably allowed to stand in a gelling vessel for a period of 5 to 60 minutes to precipitate crystalline calcium hydrogen phosphate anhydride. The heating step (c) is carried out preferably by making the slurry flow on a sloping and convex surface such as the side surface of a conical member and contacting steam with the slurry flowing on such a surface.

Other features and advantages of the invention will become apparent from the following detailed description with reference to the accompanying drawings, wherein:

FIG. 6 is a graph showing the particle size distribution of the crystals of FIG. 3;

FIG. 7 is a similar graph for the crystals of FIG. 4; and

FIG. 8 is a similar graph for the same compound prepared by a still different process not in accordance with the invention.

Figure 1:
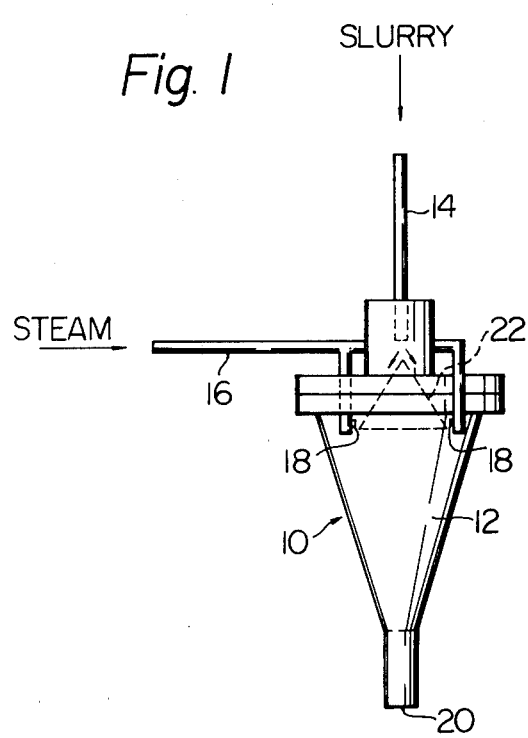
FIG. 1 is a schematic elevation of a heating apparatus for use in a process according to the invention.

In a process according to the invention, sodium ammonium hydrogen phosphate $NaNH_4HPO_4.4H_2O$ (which is commonly called microcosmic salt or phosphor salt and will hereinafter be referred to as phosphor salt for brevity) as the starting material is not necessarily prepared by the use of costly dry process phosphoric acid. From an economical viewpoint, the phosphor salt is preferably prepared by a well known process based on reactions of wet process phosphoric acid of industrial grade with ammonia and a soda alkali such as sodium carbonate. The phosphor salt is subjected to a preliminary treatment such as filtration and/or recrystallization for the purpose of removing major impurities.

Then the phosphor salt is dissolved in water to give a solution of which concentration on the basis of $P_2O_5$ is preferably about 5% by weight, and the solution is mixed with an aqueous solution of calcium chloride of which concentration is preferably about 10% by weight on the basis of $CaCl_2$. The calcium chloride solution is preliminarily filtered to remove major impurities. The mixing is carried out at or in the vicinity of room temperature preferably at such a mixing ratio that the molar ratio Ca/P is 1.1. The mixing of these two solutions results in precipitation of crystalline calcium hydrogen phosphate dihydrate by a reaction expressed by the following equation:

$$NaNH_4PO_4 + CaCl_2 + 2H_2O \rightarrow CaHPO_4 \cdot 2H_2O + NaCl + NH_4Cl$$

The thus precipitated crystalline particles of calcium hydrogenphosphate dihydrate are separated from the mother liquor, and a slurry is prepared by adding hot water of about 50° C to the separated crystalline particles. The concentration of the slurry should be in the range from 5 to 20% by weight and is preferably about 10%. Then the pH of the slurry is adjusted to a value ranging from 4.5 to 5.5 by the addition of a mineral acid such as nitric acid or hydrochloric acid. This pH range is an important feature of a process according to the invention. If the pH of this slurry is smaller than 4.5, crystals of anhydrous calcium hydrogen phosphate obtained by the subsequent procedures take the form of excessively thin plates and accordingly are not satisfactorily resistant to mechanical stresses. If the pH exceeds 5.5 on the contrary, the resulting crystals of anhydrous calcium hydrogen phosphate do not have a platy and square shape but have a parallel hexahedral or lozenge shape, and, as another disadvantage, an inconveniently long time is needed to complete the dehydration of the calcium hydrogen phosphate dihydrate.

After the adjustment of pH, the slurry is heated rapidly to a temperature between 85° and 97° C preferably by contacting the slurry with steam. The heated slurry is introduced into a gelling vessel and allowed to stand in the same vessel for a period of 5 to 60 minutes. The gelling vessel needs not to be provided with any heating means. During the stay of the slurry in the gelling vessel, calcium hydrogen phosphate dihydrate turns into gel which is substantially free from impurities remained in the starting phosphor salt and calcium chloride solutions and is gradually dehydrated or converted to crystalline calcium hydrogen phosphate anhydride. The crystalline anhydride which precipitates at the bottom of the gelling vessel is taken out of the vessel and separated from the mother liquor, followed by washing with water and drying.

It is an important advantage of a process according to the invention that anhydrous calcium hydrogen phosphate is obtained as platy and square-shaped crystals with a surprisingly high purity. The product of this process is particularly suitable for use as a raw material for fluorescent materials primarily because of its extremely small Na and Fe contents. In conventional processes which use phosphor salt, i.e., a sodium salt of phosphoric acid, as the starting material, it has been very difficult to prevent Na and Fe from remaining in the final product in appreciable concentrations. The present invention, therefore, makes a great contribution to industrial preparation of crystalline calcium hydrogen phosphate anhydride which is useful in producing fluorescent materials by the use of phosphor salt.

With respect to crystalline calcium hydrogen phosphate anhydride, it has been recognized that the average particle size and the particle size distribution are affected to some extents by the properties of calcium hydrogen phosphate dihydrate used as the raw material. According to the present invention, it has been revealed that the purity of calcium hydrogen phosphate anhydride is significantly affected by reaction conditions in the preparation of calcium hydrogen phosphate dihydrate from phosphor salt and calcium chloride.

We carried out elaborate experiments to find out a best set of reaction conditions for the preparation of calcium hydrogen phosphate dihydrate which contains only a minimized amount of Na as an impurity. Typical data of variables in these experiments as well as the resulting variations in Na content of the product are presented in the following Table 1.

Table 1

| Run No. | Molar ratio Ca/P | Feed rate[a] (ml/min) | Feed method[b] | Concentration (g/l) CaCl$_2$ | Concentration (g/l) P$_2$O$_5$ | pH adjustment pH | pH adjustment addition of HNO$_3$ | Stirring[c] rate (indications) | Na content (ppm) of CaHPO$_4 \cdot 2H_2O$ 1[d] | 2 | 3 | 4 |
|---|---|---|---|---|---|---|---|---|---|---|---|---|
| 1 | 1.01 | 170 | (A) | 87 | 55 | 5.2 | no | 7 | 133 | 105 | 104 | — |
| 2 | 1.01 | " | " | " | " | 5.3 | no | " | 114 | 123 | 122 | — |
| 3 | 1.05 | " | " | 90 | " | 5.0 | to CaCl$_2$ | " | 102 | 113 | 90 | — |
| 4 | 1.05 | " | " | " | " | 4.7 | to CaCl$_2$ | " | 147 | 149 | 148 | 156 |
| 5 | 1.10 | " | " | 95 | " | 5.4 | no | " | 87 | 90 | 86 | — |
| 6 | 1.10 | " | " | " | " | 4.6 | to CaCl$_2$ | " | 175 | 176 | 149 | 148 |
| 7 | 1.05 | " | " | 90 | " | 5.4 | no | " | 121 | 109 | 96 | 112 |
| 8 | 1.10 | " | " | 95 | " | 5.4 | no | 9 | 68 | 90 | 69 | — |
| 9 | 1.10 | " | " | " | " | 5.2 | no | 4 | 93 | 120 | 136 | — |
| 10 | 1.10 | " | (B) | " | " | 5.4 | no | 6.5 | 71 | 76 | 85 | — |
| 11 | 1.10 | " | " | " | " | 4.53 | to phosphor salt | " | 110 | 117 | 107 | — |
| 12 | 1.10 | " | " | " | " | 4.54 | to CaCl$_2$ | " | 158 | 154 | 156 | — |
| 13 | 1.10 | " | " | " | " | 4.46 | to both solutions | " | 135 | 130 | 124 | — |
| 14 | 1.10 | " | " | 47.5 | 27.5 | 5.50 | no | " | 62 | 67 | 59 | — |
| 15 | 1.20 | " | " | 103 | 55 | 5.20 | no | " | 92 | 82 | 90 | 97 |
| 16 | 1.10 | 500 | " | 95 | 55 | 5.23 | no | " | 147 | 175 | 213 | — |
| 17 | 1.10 | " | " | 47.5 | 27.5 | 5.73 | no | 9 | 107 | 109 | 102 | — |
| 18 | 1.10 | 170 | (C) | 95 | 55 | 5.4 | no | 7 | 118 | 115 | 102 | — |
| 19 | 1.10 | " | " | 95 | 55 | 4.5 | to CaCl$_2$ | " | 195 | 210 | 220 | — |

[a]The phosphor salt solution and CaCl$_2$ solution were fed substantially at the same rate.
[b](A): The phosphor salt solution was showered by means of a multiple-nozzle feeder, while the CaCl$_2$ solution was fed through a flow tube.
(B): Both solutions were showered.
(C): Both solutions were fed through flow tubes, respectively.
[c]The numerals represent dial readings of the speed regulator for the stirrer, wherein the stirring rate was 200 rpm at the indication 6.5.
[d]Analysis was carried out with three or four samples collected in the numerical order after the lapse of different times from the start of the mixing.

With reference to these data in Table 1, the following conclusions will be taken as convincing.

1. The molar ratio Ca/P should be in the range from 1.05 to 1.20, preferably in the narrower range from 1.10 to 1.15, and best results are obtained at 1.10.

2. In general, the pH of the reaction system at the end of mixing is preferably in the range from 5.0 to 5.8.

3. The concentration of the calcium chloride solution should be 20% by weight (on the basis of $CaCl_2$) at the highest and is preferably 10% at the highest.

4. The mixing of the phosphor salt solution with the calcium chloride solution is carried out preferably by feeding at least the phosphor solution to the reaction vessel in the form of shower through a multiple nozzle feeder. It is desirable to shower also the calcium chloride solution.

5. The removal of Na can be enhanced with increase in the stirring rate.

We tried to further reduce the Na content of the precipitated calcium hydrogen phosphate dihydrate by re-pulping the phosphate dihydrate in water, but it was confirmed that such washing results in reducing the Na content only by 5 to 10% of the value in the unwashed precipitate. In a process according to the invention, however, a major portion (about 70-75%) of the Na impurity in the phosphate dihydrate can be eliminated during conversion of the dihydrate to the anhydride by a rapid heating procedure. Accordingly, the Na content of the phosphate anhydride can be maintained less than 30 ppm, i.e., at permissible values for use as the raw material of fluorescent phosphate materials, if the Na content of the phosphate dihydrate is less than about 100 ppm and preferably less than about 70 ppm.

In practicing a process of the invention, the aqueous slurry of calcium hydrogen phosphate dihydrate should be heated as rapidly as possible. It is difficult to realize a satisfactorily rapid heating for the dehydration if a conventional method such as blowing of steam into the slurry or heating the slurry in a heating chamber is employed.

We have devised a highly effective heating vessel which has a slurry inlet and a plurality of steam inlets at the uppermost section and a discharge port at the bottom. The vessel has generally an inverted conical shape and the slurry inlet is so arranged to cause the slurry to fall into the vessel along the aixs of the vessel. The vessel contains a conical member arranged generally coaxially with the vessel such that the apex of the conical member is right below and at a short distance from the slurry inlet. The steam inlets take the form of a plurality of nozzles which are arranged close to the lowermost section of the conical member and directed generally tangentially of a cross-section of the conical member.

Figure 2:
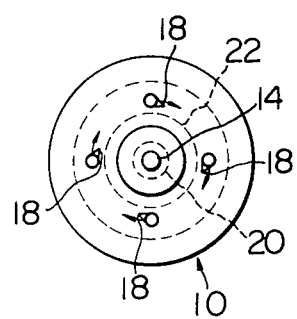
FIG. 2 is a schematic plan view of the same apparatus.

FIGS. 1 and 2 show an embodiment of a heating vessel for use in a process of the invention. A vessel 10 has generally the shape of an inverted cone and forms therein a heating chamber of a similar shape indicated at 12. The vessel 10 has a slurry inlet 14 which is on the axis of the vessel 10 and opens into the uppermost section of the heating member 12 such that the slurry falls vertically into the vessel 10. An outlet 20 of the vessel 10 is formed at the bottom of the vessel 10, i.e., the apex of the cone. A branched steam pipe 16 is assembled with the vessel 10 such that a plurality of nozzles 18 open into the heating chamber 12 in an upper section below the slurry inlet 14. A conical member 22 which has preferably a vertical angle of about 60° is disposed in the heating chamber 12 coaxially with the vessel 10. This conical member 22 is located such that its apex is at a short distance from and right below the opening of the slurry inlet 14. The periphery of the base of the conical member 22 is distant from the side wall of the heating chamber 12, and the steam nozzles 18 are located close to the side surface of the conical member 22 at the lowermost section. The nozzles 18 are preferably at least four in number and arranged circumferentially with generally equal spacings as seen in FIG. 2. The nozzles 18 are directed such that steam is injected into the heating chamber 12 generally horizontally and in tangential directions of a cross-section of the conical member 22. The conical member 22 is kept stationary with a support frame (not shown) which is preferably designed such that the position of the conical member 22 can be varied in vertical directions in case of need. For example, the support frame may consist of two bars which are arranged crosswise and secured to the side wall of the heating chamber 12 at a middle section, and the conical member 22 has a threaded pillar which extends downwards from the base and is screwed into the support frame.

When the phosphate dihydrate slurry is supplied to the thus constructed heating vessel 10, the vertically fallen slurry collides with the apex of the conical member 22 and is caused to scatter and fall along the sloping and convex side surface of the conical member 22. The scattered slurry is exposed to the swirling steam just before the slurry falls out of the conical member 22 and showers into the lower section of the heating chamber 12. Since the slurry is scattered over a wide area as a very thin layer and steam is blown from a plurality of spaced nozzles 18, when steam is blown against the slurry, the contact between the slurry and steam is realized almost ideally. Accordingly, the slurry can be heated almost instantaneously.

The thus heated slurry is discharged from the heating vessel 10 through the outlet 20 and introduced into a separate gelling vessel (not shown).

When the phosphate dihydrate slurry is supplied to the heating vessel 10 at about 50° C, the slurry can be heated to an appropriate temperature, i.e., 85°-90° C, in quite a short time (the slurry is allowed to pass through the heating chamber 12 in a few seconds) by the use of steam which is at a pressure of about 2.5 kg/cm² and at a temperature of about 145° C. It is an additional advantage of this heating vessel 10 that the ultimate temperature of the slurry in the vessel 10 can be controlled very precisely.

The following example is presented to further illustrate a process according to the invention.

EXAMPLE

Phosphor salt was prepared by a known process from wet process phosphoric acid of commercial grade and subjected to usual filtration and recrystallization procedures for removing major impurities. Then the phosphor salt was dissolved in water to give a solution which contained 4.9% by weight of $P_2O_5$. Commercially available calcium chloride was dissolved in water and filtrated to remove major impurities, and the $CaCl_2$ concentration in the solution was adjusted to 10 Wt%. These two solutions were individually heated to 30° C, and then both solutions were showered into a reaction vessel to react with each other. The quantities of the reacted phosphor salt solution and calcium chloride solution were 130 kg and 110 kg, respectively, so that the molar ratio Ca/P was 1.1. The two solutions were supplied to the vessel substantially at the same feed rate of about 500 ml/min with stirring at 200 rpm. Thus, 230 kg of an aqueous slurry of calcium hydrogen phosphate dihydrate was obtained in a concentration of 6.7 Wt% as $CaHPO_4 \cdot 2H_2O$. The pH of the slurry was 5.3.

The crystalline phosphate dihydrate particles in the thus prepared slurry were separated from the mother liquor and washed with water. The washed particles were added to water to give an aqueous slurry in a concentration of 10 Wt% as $CaHPO_4 \cdot 2H_2O$. This slurry was heated to and kept at 50° C, and 16.5% $HNO_3$ was added to the slurry to adjust the pH to 4.6. Then the slurry was introduced into the heating vessel 10 of FIG. 1, so that the slurry was heated to 95° C by steam in the heating vessel 10. The heated slurry was transferred to a gelling vessel and allowed to stand therein for a while. The heated and dehydrated phosphate gelled gradually in the gelling vessel and almost entirely precipitated at the bottom of the gelling vessel after the lapse of about 15 minutes. The precipitated crystalline particles were taken out of the gelling vessel and separated from the mother liquor. After the procedures of washing with water and drying, the particles weighed 10 kg and was identified as crystals of calcium secondary phosphate anhydride of a very high purity. The analytical values for this phosphate anhydride are presented in Table 2 together with the analytical values for the raw materials and the phosphate dihydrate.

Table 2

|  | $P_2O_5$ (Wt%) | $Na_2O$ (Wt%) | $NH_3$ (Wt%) | $CaCl_2$ (Wt%) | Fe (ppm) | Na (ppm) |
|---|---|---|---|---|---|---|
| Phosphor salt solution | 4.9 | 2.14 | 1.17 | — | 4.1 | — |
| $CaCl_2$ solution | — | — | — | 10.0 | 0.08 | 980 |
| Phosphate dihydrate | 41.01 | — | — | — | 2.4 | 30.0 |
| Phosphate anhydride | 51.95 | — | — | — | 2.2 | 8.5 |

Figure 3:
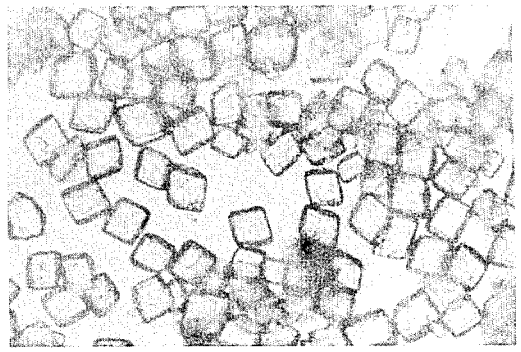
FIG. 3 is a micrograph of anhydrous calcium hydrogen phosphate crystals prepared by a process according to the invention.

The phosphate anhydride crystals obtained in this Example were platy and had a uniform and square shape as seen in the micrograph of FIG. 3. The graph of FIG. 6 shows an extremely narrow dispersion in the particle size of these crystals.

Figure 4:
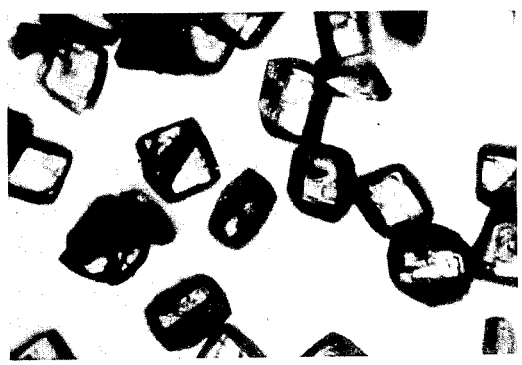
FIGS. 4 and 5 are micrographs of anhydrous calcium hydrogen phosphate crystals of two different types prepared respectively by two processes not in accordance with the invention.
Figure 5:
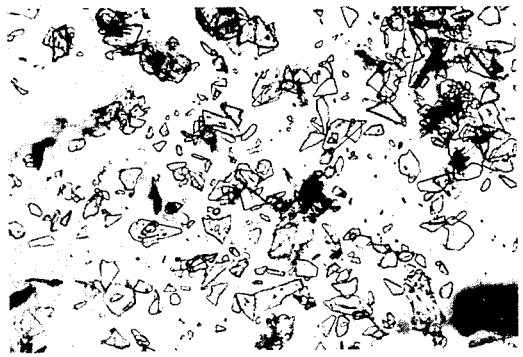

When the same phosphate anhydride was prepared generally in accordance with this Example except that the pH of the phosphate dihydrate slurry was adjusted to 6.0, the crystals of the phosphate anhydride had a parallel hexahedral shape as seen in the micrograph of FIG. 4. The particle size distribution of the crystals of FIG. 4 is shown in the graph of FIG. 7. When the heating of the phosphate dihydrate for the dehydration was carried out by blowing steam into the slurry in a conventional way (accordingly, the heating was not accomplished satisfactorily rapidly), the dispersion in the particle size broadened significantly as shown in the graph of FIG. 8. When the heating for the dehydration were carried out in an oven maintained at 180° C, the phosphate anhydride was obtained in the form of very irregularly and non-uniformly shaped crystalline particles as seen in the micrograph of FIG. 5.

What is claimed is:

1. A process of preparing highly pure calcium hydrogenphosphate anhydride in the form of platy crystals of uniform particle size, the process comprising the steps of:

preparing calcium hydrogenphosphate dihydrate by preparing a first aqueous solution of sodium ammonium hydrogenphosphate of commercial grade in a concentration of about 5% by weight on the basis of $P_2O_5$;

preparing a second aqueous solution of calcium chloride in a concentration of 20% by weight at the highest on the basis of $CaCl_2$;

mixing said first aqueous solution with said second aqueous solution by showering said first and second aqueous solutions into a vessel; the quantities of said first and second aqueous solutions being determined such that the molar ratio expressed by Ca/P is in the range of from 1.05 to 1.20, the pH of the mixture being adjusted such that the pH of the mixture at the end of the mixing step is in the range from 5.0 to 5.8;

preparing an aqueous slurry of said calcium hydrogen-phosphate dihydrate in a concentration ranging from 5 to 20% by weight;

adjusting the pH of said slurry to a value in the range from 4.5 to 5.5; and flowing said slurry on a sloping and convex surface as a thin layer stream and blowing steam against the flowing slurry to rapidly heat said slurry to a temperature in the range of 85° to 97° C.

2. A process as claimed in claim 1 further comprising the step of allowing the heated slurry to stand in a vessel for a period of 6 to 60 minutes to precipitate crystalline calcium hydrogenphosphate anhydride.

3. A process as claimed in claim 2 wherein said sloping and convey surface is the side surface of a conical member, said slurry being made to flow from the apex of said conical member towards the periphery of the base of said conical member, said steam being blown against said slurry flowing on said side surface generally in a tangential direction of a cross section of said conical member.

4. A process as claimed in claim 3 wherein said steam is blown against said slurry as a plurality of streams respectively starting from a plurality of nozzles in a circumferential arrangement around said side surface.

5. A process as claimed in claim 3 wherein said slurry is maintained at a temperature of about 50° C. until said slurry is subjected to the heating step.

6. A process as claimed in claim 2 wherein the pH adjustment step is carried out by adding a mineral acid selected from the group consisting of nitric acid and hydrochloric acid to said slurry.

7. A process as claimed in claim 1 wherein said molar ratio is 1.10.

8. A process as claimed in claim 1 wherein said molar ratio is in the range from 1.1 to 1.15.

9. A process according to claim 1 wherein said highly pure calcium hydrogenphosphate dihydrate is prepared by mixing said first aqueous solution of sodium ammonium hydrogen-phosphate with a second aqueous solution of calcium chloride having a concentration of about 10% by weight on the basis of $CaCl_2$ at a temperature in the vicinity of room temperature, the mixing being carried out by simultaneously showering said first and second aqueous solutions into a vessel and stirring the resultant mixture, the quantities of said first and second aqueous solutions being determined such that the molar ratio expressed by Ca/P is in the range of from 1.1 to 1.15;

wherein after slurry formation and pH adjustment, the said slurry is flowed on the side surface of a conical member as a thin layer stream from the apex of said conical member to the base of said conical member and blowing steam against the flowing slurry generally tangentially of a cross section of said conical member to rapidly heat said slurry to a temperature in the range from 85° to 97° C.; and allowing the heated slurry to stand in a vessel for a period of 5 to 60 minutes to precipitate crystalline calcium hydrogenphosphate anhydride.

10. A process as claimed in claim 9 further comprising the step of maintaining said slurry at about 50° C. until said slurry is flowed on said side surface.

* * * * *